(12) United States Patent
Wang et al.

(10) Patent No.: US 12,334,052 B2
(45) Date of Patent: Jun. 17, 2025

(54) METHOD FOR TRAINING A SPEECH RECOGNITION MODEL AND METHOD FOR SPEECH RECOGNITION

(71) Applicant: MONTAGE LZ TECHNOLOGIES (CHENGDU) CO., LTD., Sichuan (CN)

(72) Inventors: Xuepeng Wang, Chengdu (CN); Taibo Dong, Chengdu (CN); Gang Hu, Chengdu (CN)

(73) Assignee: MONTAGE LZ TECHNOLOGIES (CHENGDU) CO., LTD., Chengdu (CN)

( * ) Notice: Subject to any disclaimer, the term of this patent is extended or adjusted under 35 U.S.C. 154(b) by 372 days.

(21) Appl. No.: 17/862,426

(22) Filed: Jul. 12, 2022

(65) Prior Publication Data

US 2023/0031733 A1 Feb. 2, 2023

(30) Foreign Application Priority Data

Jul. 23, 2021 (CN) .......................... 202110839560.6

(51) Int. Cl.
*G10L 15/06* (2013.01)
*G10L 15/02* (2006.01)
(Continued)

(52) U.S. Cl.
CPC ............ *G10L 15/063* (2013.01); *G10L 15/02* (2013.01); *G10L 15/16* (2013.01); *G10L 15/22* (2013.01)

(58) Field of Classification Search
CPC ....... G10L 15/063; G10L 15/02; G10L 15/16; G10L 15/22
See application file for complete search history.

(56) References Cited

U.S. PATENT DOCUMENTS 11,468,314 B1 * 10/2022 Singh ..................... G06N 3/048
2020/0035222 A1 * 1/2020 Sypniewski ........... G06N 3/044
(Continued)

FOREIGN PATENT DOCUMENTS

CN 112800748 A * 5/2021 ............ G06F 40/211

*Primary Examiner* — Richemond Dorvil
*Assistant Examiner* — Zeeshan Mahmood Shaikh
(74) *Attorney, Agent, or Firm* — Junhe Law Office P.C.; James J. Zhu

(57) ABSTRACT

This application relates to a method for training a speech recognition model comprising: providing a speech training data set comprising a plurality of speech data items and corresponding speech tags; providing a speech recognition model to be trained comprising a convolution neural network, a first fully connected network, a recurrent neural network and a second fully connected network which are cascade coupled together, wherein each of the networks comprises one or more network layers each having a parameter matrix; and the speech recognition model processing speech data items to generate corresponding speech recognition results; and using the speech training data set to train the speech recognition model such that the parameter matrices of at least two adjacent network layers satisfies a predetermined constraint condition; and the speech recognition model trained using at least one loss function can generate speech recognition results at an accuracy satisfying a predetermined recognition target.

18 Claims, 2 Drawing Sheets

(51) Int. Cl.
    *G10L 15/16*     (2006.01)
    *G10L 15/22*     (2006.01)

(56) References Cited

U.S. PATENT DOCUMENTS

2020/0160843 A1*   5/2020   Shillingford ............ G10L 15/24
2021/0312294 A1*  10/2021   Kurata .................... G06F 18/24
2023/0072352 A1*   3/2023   Geng ...................... G10L 15/16

* cited by examiner

METHOD FOR TRAINING A SPEECH RECOGNITION MODEL AND METHOD FOR SPEECH RECOGNITION

TECHNICAL FIELD

The present disclosure relates to the field of speech recognition technology, and particularly relates to a method for training a speech recognition model and a method for speech recognition based on a trained speech recognition model.

BACKGROUND

Automatic speech recognition (ASR) technology began in the 1950s is one of the crossing domains between linguistics and computer science, purposes to convert the speech signal into corresponding words by computing device thereby to recognize the speech instructions and text contents of speaker. During the several decades of development, ASR technology has experienced from simple numbers and syllables recognition to systematic theoretical method establishment, from original pattern matching to statistical algorithm represented by hidden Markov model (HMM) incorporating Gaussian mixture model (GMM), and to deep learning algorithm represented by neural network.

Pattern matching may only recognize simple single syllables, while the processes building the GMM-HMM recognition model are too complicated and lack capacity of automatic alignment, so an end-to-end speech recognition model is proposed based on deep neural network (DNN) to significantly improve the accuracy of recognition while simplifying the building processes. Each layer of the DNN uses fully connected (FC) network, the parameter scale of the DNN is big and part of structural feature of the speech feature space cannot been fully utilized, therefore people turned to convolution neural network (CNN) which is widely applied in image recognition. CNN uses a convolution kernel with pretty small scale, combined a pooling operation with down sampling function, so that the convolution operation has translation invariance to overcome the complicated change of speech. Cascade of multi-layer CNNs fully utilizes multi-scale structural features of the speech feature space. The recursive neural network (RNN) models the semantic association of the context through the recursive relation after the CNN performs feature processing and preliminary classification for the input feature, further the recognition accuracy has been improved.

The end-to-end model currently widely used are mainly divided into two categories, one is small and medium parameter scale model using CNN, RNN incorporated with connectionist temporal classification (CTC), another is big parameter scale model represented by attention mechanism. The attention mechanism is only suitable for recognition of cloud end, while the CNN-LTSM-CTC model suitable for embedded devices need to perform residual network (resnet) connection and normalization several times which involves a mass of data read-write and operations, therefore the processing latency is unsatisfactory.

Therefore, it is necessary to provide an improved method for training a speech recognition model.

SUMMARY

This application purposes to provide a lightweight method for training a speech recognition model.

According to an aspect of the application, a method for training a speech recognition model is provided, the method comprises providing a speech training data set comprising a plurality of speech data items and speech tags each corresponding to a speech data item; providing a speech recognition model to be trained, the speech recognition model to be trained comprising a convolution neural network, a first fully connected network, a recurrent neural network and a second fully connected network which are cascade coupled together, wherein each of the networks comprises one or more network layers each having a parameter matrix; and wherein the speech recognition model is configured to process speech data items to generate corresponding speech recognition results; and using the speech training data set to train the speech recognition model such that the parameter matrices of at least two adjacent network layers of the trained speech recognition model satisfies a predetermined constraint condition as below: a condition number $L_{cond}$ is smaller than a first threshold, wherein the condition number is given by an equation $$L_{cond} = \left(\left(\frac{\sigma_{max}}{\sigma_{min}} - 1\right)^2 + (\sigma_{max} - 1)^2\right),$$

wherein $\sigma_{max}$ and $\sigma_{min}$ respectively represent a largest singular value and a smallest singular value of a parameter matrix; and the speech recognition model trained using at least one loss function can generate speech recognition results at an accuracy satisfying a predetermined recognition target.

According to another aspect of the application, a method for speech recognition is provided, the method comprises the follow steps: providing a speech recognition model comprising a convolution neural network, a first fully connected network, a recurrent neural network and a second fully connected network which are cascade coupled together, wherein each of the networks comprises one or more network layers each having a parameter matrix; using the following steps to train the speech recognition model: providing a speech training data set comprising a plurality of speech data items and speech tags each corresponding to a speech data item; using the speech recognition model to process speech data items of the speech training data set to generate corresponding speech recognition results; enabling the parameter matrices of at least two adjacent network layers of the trained speech recognition model to satisfy a predetermined constraint condition as below: a condition number $L_{cond}$ is smaller than a first threshold, wherein the condition number is given by an equation $$L_{cond} = \left(\left(\frac{\sigma_{max}}{\sigma_{min}} - 1\right)^2 + (\sigma_{max} - 1)^2\right),$$

wherein $\sigma_{max}$ and $\sigma_{min}$ respectively represent a largest singular value and a smallest singular value of a parameter matrix; and the speech recognition model trained using at least one loss function can generate speech recognition results at an accuracy satisfying a predetermined recognition target; receiving a speech input signal for processing and preprocessing the speech input signal to generate a corresponding speech feature vector; and using the trained speech recognition model to process the speech feature vector to generate corresponding speech recognition results.

According to another aspect of the application, a non-transitory computer readable medium containing one or more executable instructions is provided, the one or more executable instructions implemented by a processor execute the method of above aspects.

The foregoing is an overview of the present application, which may simplify, summarize, and omit details. Those skilled in the art will appreciate that this section is merely illustrative and not intended to limit the scope of the present application in any way. This summary section is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION

Figure 1:
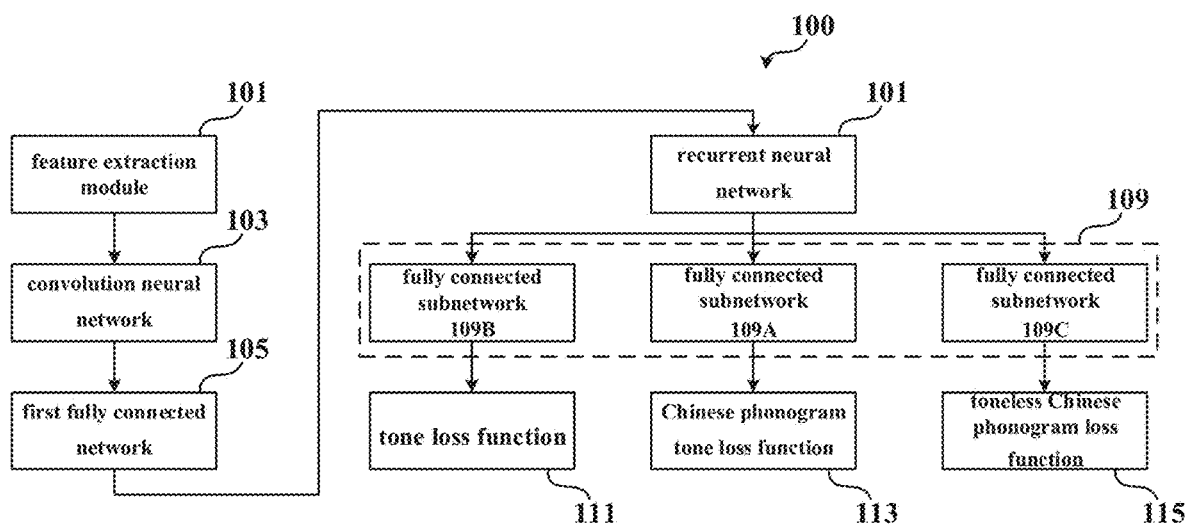
FIG. 1 depicts a speech recognition model according to an embodiment of the present application.

In the following detailed description, reference is made to the accompanying drawings which form a part hereof. In the drawings, similar reference numerals generally refer to similar parts unless the context clearly dictates otherwise. The illustrative embodiments described in the detailed description, drawings and claims are not intended to be limiting. Other embodiments may be employed, and other changes may be made without departing from the spirit or scope of the subject matter of the present application. It is to be understood that various configurations, substitutions, combinations, and designs of the various forms of the present application, which are generally described in this application and are illustrated in the drawings, are intended to constitute a part of the present application.

FIG. 1 depicts a block diagram of a speech recognition model 100 according to an embodiment of the present application. In some embodiments, the speech recognition model 100 may be implemented in hardware, software or a combination of hardware and software. The hardware portion may be implemented using dedicated logic; the software portion may be stored in a memory and performed by suitable instruction performing system, such as microprocessor or dedicated design hardware. Those skilled in the art will appreciate that the device, apparatus and method of the present application may be implemented by using computer-executable instructions and/or containing in a processor control code, for example those codes are provided on a carrier medium such as disk, CD or DVD-ROM, a programmable memory such as read-only memory (firmware), a data carrier such as optical carrier or electronic signal carrier.

Referring to FIG. 1, the speech recognition model 100 comprises a feature extraction module 101 to preprocess an original speech input signal and generate a corresponding speech feature vector. For example, the feature extraction module 101 may be coupled to a microphone or similar audio sampling or inputting devices to receive sampled or inputted speech input signal therefrom. In some embodiments, the feature extraction module 101 comprises an analog-digital converter for converting the received speech input signal in analog format into digital signal for subsequent processing. In some other embodiments, for example, in the case where the original speech input signal is in digital format, the feature extraction module 101 may not comprise an analog-digital converter. In some embodiment, the speech input signal in analog format may be sampled at a predetermined sampling frequency (for example 16 kHz); and the sampled speech data point may be framed at predetermined frame length (for example 10 milliseconds) to generate multiple speech data frames having the predetermined frame length, those continuous multiple speech data frames form the speech feature vectors reflecting feature information of the original speech input signal. Each speech data frame may comprise corresponding numbers of speech data points. For example, in the case where the speech input signal is sampled at a 16 kHz sampling frequency and the frame length is 10 milliseconds, each speech data frame may have 160 speech data points. It should be understood that the frame length of the foregoing embodiments is represented as time duration, in other cases, the frame length may be represented as numbers of speech data points, for example the frame length is 160 speech data points, or the frame length is 256 speech data points, the sampling frequency and numbers of the speech data points of each frame are corresponding to frame length represented by the time duration. In some optional embodiments, when processing the framing sampled by the speech signal, the speech data points are cropped through overlapping a part of each other rather than back to back, that is, frame shifts are introduced among different speech data frames. It should be understood that overlappingly cropping the speech data points may increase the correlation between adjacent or close speech data frames.

In some embodiments, each speech data frame is a time-domain signal comprising the speech data points sampled in timing sequence. In some other embodiments, each speech data frame may also be processed by fast Fourier transform to obtain a signal in frequency domain format.

Still referring to FIG. 1 the speech recognition model 100 also comprises a convolution neural network 103, a first fully connected network 105, a recurrent neural network 107 and a second fully connected network 109 which are cascade coupled together, wherein the convolution neural network 103 is coupled to the feature extraction module 101 for receiving speech feature vectors therefrom. As such, the speech feature vectors may be processed by the foregoing networks in order to generate speech recognition results corresponding to the speech feature vectors.

It should be understood that, for the convolution neural network 103, the first fully connected network 105, the recurrent neural network 107 and the second fully connected network 109 in the speech recognition model 100, each of the networks may respectively have different weight coefficient matrices, and may use a predetermined speech training data set to train the speech recognition model 100 to respectively determine values of the weight coefficient matrices of these networks. For example, the convolution neural network 103 may have one or more convolution kernel matrices, each convolution kernel matrix may process convolution with the inputted speech feature vectors; wherein, the convolution kernel matrix may be constructed as a weight coefficient matrix having a plurality of weight coefficients. The fully connected network and the recurrent neural network may also have similar weight coefficient matrices. In this way, the trained speech recognition model 100 may be used to process unknown speech input signals and generate speech recognition results corresponding to those speech input signals.

The convolution neural network 103 may have one or more convolution subnetworks. In some embodiments, the convolution subnetworks may have a convolution layer, a nonlinear activation layer and a pooling layer. Wherein, each convolution layer has convolution kernel matrices and uses the convolution kernel matrices to process point-by-point convolution with the inputted speech feature vectors (usually are two-dimensional time-frequency vectors) to extract feature information of speech feature vectors. Different convolution kernel matrices may have same or different dimensions. Then, the nonlinear activation layer may perform nonlinear operation on the convoluted speech feature vectors, thereby all elements thereof less than 0 are set to 0. Finally, the pooling layer may further perform pooling operation on the nonlinear activated speech feature vectors to maintain most important information (some unimportant samples in the speech feature vectors may be removed) thereof while reducing the dimensionality. It should be understood that, in some embodiments, one or more convolution subnetworks may only have a convolution layer, for example do not have a nonlinear activation layer and a pooling layer.

Figure 2:
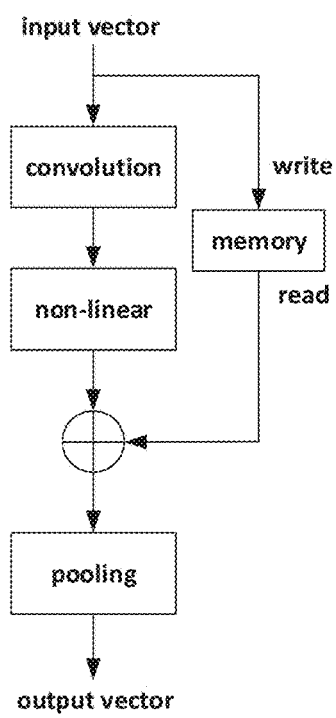
FIG. 2 depicts a flow chart of a convolution subnetwork to perform vector processing, the convolution subnetwork uses residual network to process cross-layer connection.

FIG. 2 depicts a flow chart of a convolution subnetwork to perform vector processing, the convolution subnetwork uses residual network (resnet) to process cross-layer connection. As shown in FIG. 2, when processing current convolution, the inputted feature vectors need to be stored in the memory, and after the nonlinear processing is completed, a sum operation is performed between the current operation results and the inputted feature vectors, and then an output feature vector is generated after the sum operation and the pooling operation.

To avoid the problems generated by foregoing residual network cross-layer connection, in some embodiments of the present application, when processing the inputted two-dimensional speech feature vectors, such as recognizing or training, the two-dimensional speech feature vectors may be converted by a convolution operation with a step of 1, and converted vectors are stored in the memory such that the two-dimensional speech feature vectors stored in the memory are continuous. In addition, since no cross-layer connection is used, the currently calculated data do not need to be additionally stored in the memory, which may avoid a mass of data read-write operations, thereby the calculation efficiency is improved. A step means the amount of movement of the convolution kernel matrix relative to the window of the speech feature vectors.

Still referring to FIG. 1, the convolution neural network 103 is coupled to the first fully connected network 105 to globally correlate the information at different time/frequency. In some embodiments, the first fully connected network 105 may have one or more fully connected layers. The more fully connected layers there are, the more accurate the information processing is, but the amount of the weight parameter is also bigger. In practical applications, an appropriate amount of the fully connected layer should be selected to balance the accuracy of information processing and the requirement of processing capacity. For example, the amount of the fully connected layers in the first fully connected network 105 may be less, such as one, in some embedded device or other devices with limited processing/computing resources.

The first fully connected network 105 is coupled to the recurrent neural network 107. Regarding sequence vectors such as speech feature vectors, using a recurrent neural network such as a gated recurrent neural network enables to utilize the state of a previous time step when solving the state of the current time step, because the state of the current time step in the model of the recurrent neural network model is determined by the input of the current time step and the state of the previous time step. In some other embodiments, the recurrent neural network 107 may be a long-short term memory-based network, a gated recurrent unit-based network, or other types of recurrent neural network. Regarding the gated recurrent unit-based recurrent neural network, its single unit can control reset and update simultaneously; the update function is used to control an amount of the state information at a previous moment to be brought into current state, the reset function is used to control an amount of the state information at the previous moment to be written to the current candidate set.

In practical applications, the speech recognition model 100 shown in FIG. 1 needs to be trained to determine the values of each weight parameter matrices therein. In some embodiments of the present application, the training method shown in FIG. 3 is provided to train the speech recognition model 100 shown in FIG. 1.

Figure 3:
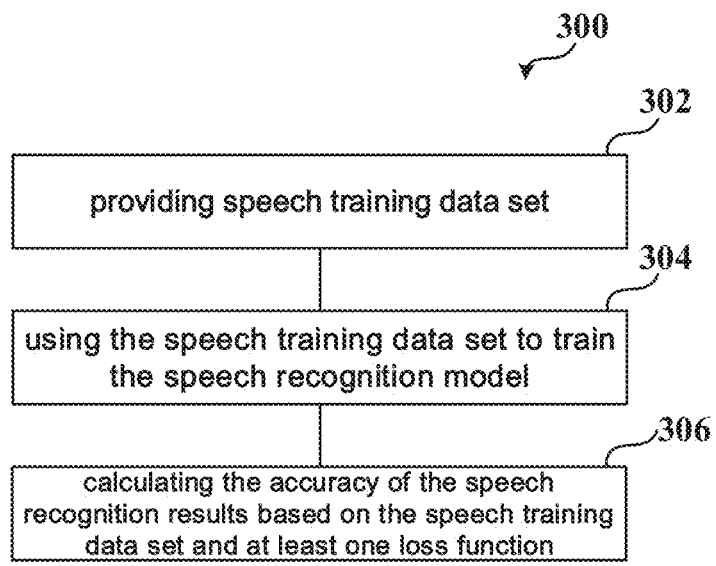
FIG. 3 depicts a method for training a speech recognition model according to an embodiment of the present application.

As shown in FIG. 3, in step 302, a speech training data set comprising a plurality of speech data items and speech tags each corresponding to speech data item. The speech data items may have similar format with the speech feature vectors to be recognized, that is, the speech data items are also a two-dimension time-frequency vector. In some embodiments, the open-source speech data items with speech tags may be used as a speech training data set, such as Aishell data set. Those skilled in the art should appreciate that different speech training data sets can be used to train the speech recognition model 100 according to different objects.

Subsequently, in step 304, the speech training data set may be used to train the speech recognition model 100 shown in FIG. 1. In particularly; a condition number may be applied to the convolution neural network 103, the first fully connected network 105 and the second fully connected network 109 of the speech recognition model 100.

In particularly, for a matrix A, its condition number on the p-norm is given by an equation (1):

$$\text{cond}_p(A) = \|A\|_p \|A^{-1}\|_p \quad (1)$$

wherein p is a positive integer. For example, p-norm is 2-norm, the condition number can be calculated by singular value decomposition, as shown in an equation (2):

$$\text{cond}_2(A) = \frac{\sigma_{max}}{\sigma_{min}} \quad (2)$$

$\sigma_{max}$ and $\sigma_{min}$ respectively represent a largest singular value and a smallest singular value of the weight parameter matrix. The condition number $L_{cond}$ is given by the following equation (3):

$$L_{cond} = \left(\frac{\sigma_{max}}{\sigma_{min}} - 1\right)^2 \quad (3)$$

The experimental results show that when the constraint loss function of the condition number $L_{cond}$ approaches 1, the dynamic range of each element in matrix A remains to be consistent.

In addition, in order to avoid normalization, that is to ensure that the dynamic range of each parameter matrix remains to be consistent, it can be known from the following inequality (4):

$$\sigma_{min}(A) \cdot \|x\|_2 \leq \|Ax\|_2 \leq \sigma_{max}(A) \cdot \|x\|_2 \quad (4)$$

wherein if an input matrix A is a matrix of dimension m*n, then x is any input vector with a dimension of n*1, and the output matrix Ax is not equal to 0, that is, x is any vector that does not belong to the null space of matrix A.

The sufficient condition for remaining the dynamic range of the input matrix A and the output matrix Ax consistent is as shown in formula (5):

$$\sigma_{min} \to 1 \leftarrow \sigma_{max} \quad (5)$$

That is, both the largest singular value and the smallest singular value of matrix A should be approaching 1, for example, the difference between the largest singular value and 1 and the difference between the smallest singular value of matrix A and 1 are both less than 0.2. Therefore, the modified condition number $L_{cond}$ is given by an equation (6):

$$L_{cond} = \left(\left(\frac{\sigma_{max}}{\sigma_{min}} - 1\right)^2 + (\sigma_{max} - 1)^2\right) \quad (6)$$

In some embodiments, the value of the modified condition number may be less than a first threshold, for example less than 20%, preferably, less than 5%.

Therefore, in some embodiments, during the training process of step 304, the modified condition number as shown in equation (6) is applied to each layer of the convolution neural network 103, the first fully connected network 105 and the second fully connected network 109 so that dynamic range of valid parameters of each convolution kernel matrix of the trained speech recognition model 100 and the parameter matrix of fully connected layers remain in a consistent range. After training in this way, unnecessary normalization operation on the parameter matrix can be avoided, and the processing resources required by repeatedly reading and writing data can be reduced, thereby the trained speech recognition model 100 may be easily deployed on the embedded devices or other devices with limited computing/process resources. If the foregoing method is not adopted, the dynamic range of the valid parameter of the convolution kernel matrix and parameter matrix in the trained speech recognition model will not be constrained, and will be widely distributed, and difficult to be deployed on embedded devices.

Still referring to FIG. 1, to evaluate the accuracy of the speech recognition results outputted by the speech recognition model 100, in some embodiments, the speech recognition model 100 may have at least one loss function for measuring and calibrating the accuracy of the speech recognition results. In the embodiment shown in FIG. 1, the speech recognition model 100 may comprise three loss functions, they are a tone loss function 111, a Chinese phonogram tone loss function 113 and a toneless Chinese phonogram loss function 115; in other embodiment, the speech recognition model may only comprise one loss function, such as only comprise a Chinese phonogram tone loss function 113.

In particularly, when using the training method shown in FIG. 3 to train the speech recognition model 100, the loss function can be used to evaluate that whether the speech recognition capability of the speech recognition model 100 satisfies a predetermined recognition target. If the speech recognition model 100 does not satisfy the predetermined recognition target, then the speech recognition model 100 need to be continuously trained until satisfying the predetermining recognition target.

Correspondingly, in step 306 shown in FIG. 3, the accuracy of the speech recognition results can be trained based on the speech training data set and at least one loss function.

It should be understood that each loss function corresponds to one speech training data set. For example, regarding application for Chinese speech recognition, the loss function can be Chinese phonogram tone loss function, that is, the accuracy of the speech recognition results (the probability that the speech recognition results satisfies the predetermined Chinese phonogram tone tag) is calculated based on the tags including Chinese phonogram and tone. For another example, the loss function can be toneless Chinese phonogram loss function, that is, the accuracy of the speech recognition results (the probability that the speech recognition results satisfies the predetermined toneless Chinese phonogram tag) is calculated based on the tags including toneless Chinese phonogram. In some embodiments, the loss function may also provide tone loss function, that is the accuracy of the speech recognition results (the probability that the speech recognition results satisfies the predetermined tone tag) is calculated based on the tags including tone. Preferably, these loss functions can be used simultaneously to improve the train speed of the speech recognition model though multitask computing.

In some embodiments, the loss function can be a connectionist temporal classification (CTC) loss function. The CTC loss function may have characteristics of coping with a variable length of phonograms and reasonably removing redundant judgments, thereby it is especially suitable for speech recognition. In one embodiment, the CTC loss function CTC(x) can be constructed as follows:

For an input sequence $x=(x_1, x_2, \ldots, x_T)$ with a given length T and corresponding output tag sequence 1, when the CTC loss function CTC(x) is defined as an given x, the negative logarithm of condition probability of 1:

$$CTC(x) = -\log P(l|x) = -\log \sum_{\pi \in B^{-1}(1)} p(\pi|x) = -\log \sum_{\pi \in B^{-1}(1)} \prod_{t=1}^{T} y_{\pi_t}^t \quad (7)$$

wherein, B represents the mapping relationship between the path and the tag sequence, $y_{\pi_t}^t$ represents the probability of observing the tag $\pi_t$ at the t frame; the tag refers to Chinese phonogram corresponding to some speech feature vectors in the speech training data set (for example, the speech training data set is Chinese speech training data set).

For example, in the embodiment shown in FIG. 1, the Chinese phonogram tone loss function $CTC_1(x)$, the tone loss function $CTC_2(x)$ and the toneless Chinese phonogram loss function $CTC_3(x)$ are simultaneously used to train the speech recognition model. Those loss functions all can be utilized in the form of the CTC(x) loss function shown in equation (7), the difference is only that the speech feature tags are different when training (determined by corresponding speech training data set). Wherein, the Chinese phonogram tone loss function $CTC_1(x)$ may calculate the accuracy of the speech recognition results based on the speech recognition results outputted by the second fully connected network and the Chinese phonogram tone tag in the speech training data set, the Chinese phonogram tone loss function $CTC_1(x)$ correspondingly outputs a Chinese phonogram tone with a highest probability, that is, a loss function relates to the Chinese phonogram tone. Similarly, the tone loss function $CTC_2(x)$ correspondingly outputs a tone with a highest probability, that is, a loss function relates to the tone (as a tag); the toneless Chinese phonogram loss function $CTC_3(x)$ correspondingly outputs a toneless Chinese phonogram with a highest probability, that is, a loss function relates to the toneless Chinese phonogram (as a tag). For example, corresponding predetermined recognition targets are set to each loss function, such as the accuracy of speech recognition is not less than 85%, 90% or 95%. Alternatively, those loss functions can be weighted, and the accuracy of the speech recognition calculated by weighted loss functions may satisfy the predetermined recognition target. For example, the accuracy of speech recognition CTC'(x) can be calculated by the method shown in equation (8):

$$CTC'(x)=a*CTC_1(x)+b*CTC_2(x)+c*CTC_3(x) \quad (8)$$

wherein a, b and c are predetermined weight coefficients, and can be determined according to practical applications. For example, in some embodiments, the sum of a, b and c can be 1. For example, a can be 0.5, b can be 0.25 and c can be 0.25. Correspondingly, the predetermined recognition target can be set as the accuracy is not less than 90%, 95% or other numbers. In the case of providing a plurality of loss functions to evaluate the speech recognition model, the method for training the speech recognition model can take full advantage of the acoustic rules of Chinese speech, and the training processes are set as multitask training so that the speech recognition model can converge quickly at a small parameter scale to improve the accuracy of the speech recognition.

Still referring to FIG. 1, to provide different loss functions for speech recognition results, the second fully connected network 109 may comprise a fully connected subnetwork 109A, a fully connected subnetwork 109B and a fully connected subnetwork 109C Wherein, the fully connected subnetwork 109A may be cascade coupled with the tone loss function $CTC_2(x)$ 111, the fully connected subnetwork 109B may be cascade coupled with the Chinese phonogram tone loss function $CTC_1(x)$ 113, and the fully connected subnetwork 109B may be cascade coupled with the toneless Chinese phonogram loss function $CTC_3(x)$ 115. The second fully connected network 109 can output corresponding one-dimension vector (speech recognition results, such as Chinese phonogram tone, toneless Chinese phonogram, or tone) to each loss function.

It should be understood that, when using the training method shown in FIG. 3 to train the speech recognition model, a plurality of loss functions can be set to improve the training efficiency, but the recognition results such as toneless Chinese phonogram and tone should not be outputted when recognizing unknown speech feature vectors. Correspondingly, when recognizing, only the Chinese phonogram tone loss function $CTC_1(x)$ can be reserved without considering other loss functions. It should be understood that, in some embodiments, other types of loss functions, except the CTC loss functions, can be used to evaluate the accuracy of the speech recognition results.

Figure 4:
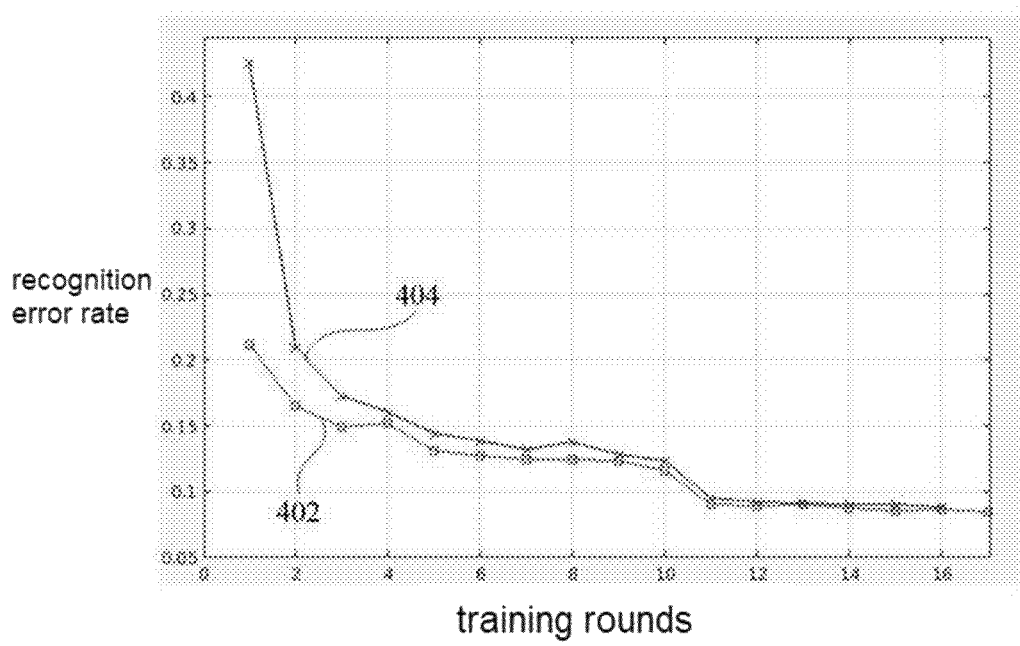
FIG. 4 is a schematic diagram showing the comparison of the recognition error rate of the speech recognition model trained with multiple loss functions and the recognition error rate of the speech recognition model trained with one loss function.

FIG. 4 shows a comparison of a recognition error rate of the speech recognition model trained using multiple loss functions and a recognition error rate of the speech recognition model trained using one loss function. Wherein, the curve 402 shows the results of training with three loss functions, and the curve 404 shows the results of training with only one Chinese phonogram tone loss function. As can be seen in FIG. 4, in the case of a small numbers of training rounds, the recognition error rate using multiple loss functions is significantly less than the recognition error rate using a single loss function.

In some embodiments, the present application also provides some computer program products comprising non-transitory computer readable medium. The non-transitory computer readable medium may comprise computer-executable codes to implement the speech recognition method and method for training the speech recognition model according to the present application. In some embodiments, the computer program products may be stored in hardware devices, such as audio devices or other computing devices.

The embodiments of the present application may be implemented in hardware, software or a combination of hardware and software. The hardware portion may be implemented using dedicated logic; the software portion may be stored in a memory and performed by suitable instruction performing system, such as microprocessor or dedicated design hardware. Those skilled in the art will appreciate that the device, apparatus and method of the present application may be implemented by using computer-executable instructions and/or containing in a processor control code, for example those codes are provided on a carrier medium such as disk, CD or DVD-ROM, a programmable memory such as read-only memory (firmware), a data carrier such as optical carrier or electronic signal carrier. For example, the device and modules of the present application may be implemented in very large-scale integrated circuit or gate array, semiconductor such as logic chip, transistor, hardware circuit of programmable hardware device such as field-programmable gate array, programmable logic devices, may also be implemented in software executed by various types of processors, may also be implemented in a combination of foregoing hardware circuits and software such as firmware.

Those skilled in the art will be able to understand and implement other changes to the disclosed embodiments by studying the specification, disclosure, drawings and appended claims. In the claims, the wordings "comprise", "comprising", "comprise" and "including" do not exclude other elements and steps, and the wordings "a" and "an" do not exclude the plural. In the practical application of the present application, one component may perform the functions of a plurality of technical features cited in the claims. Any reference numeral in the claims should not be construed as limit to the scope.

What is claimed is:
1. A method for training a speech recognition model, the method comprising:
  providing a speech training data set comprising a plurality of speech data items and speech tags each corresponding to a speech data item;

providing a speech recognition model to be trained, the speech recognition model to be trained comprising a convolution neural network, a first fully connected network, a recurrent neural network and a second fully connected network which are cascade coupled together, wherein each of the networks comprises one or more network layers each having a parameter matrix; and wherein the speech recognition model is configured to process speech data items to generate corresponding speech recognition results; and using the speech training data set to train the speech recognition model such that the parameter matrices of at least two adjacent network layers of the trained speech recognition model satisfies a predetermined constraint condition as below:

a condition number $L_{cond}$ is smaller than a first threshold, wherein the condition number is given by an equation $$L_{cond} = \left(\left(\frac{\sigma_{max}}{\sigma_{min}} - 1\right)^2 + (\sigma_{max} - 1)^2\right),$$

wherein $\sigma_{max}$ and $\sigma_{min}$ respectively represent a largest singular value and a smallest singular value of a parameter matrix; and the speech recognition model trained using at least one loss function can generate speech recognition results at an accuracy satisfying a predetermined recognition target.

2. The method of claim 1, wherein the speech training data set is a Chinese speech training data set, and the at least one loss function comprises a Chinese phonogram tone loss function, a tone loss function and a toneless Chinese phonogram loss function.

3. The method of claim 2, wherein the speech recognition model trained using each loss function can generate speech recognition results at an accuracy exceeding the predetermined recognition target.

4. The method of claim 2, wherein the speech recognition model trained using the respective loss functions can generate speech recognition results at a weighted accuracy exceeding the predetermined recognition target.

5. The method of claim 2, wherein the at least one loss function is a connectionist temporal classification loss function.

6. The method of claim 2, wherein the second fully connected network comprises at least one fully connected subnetwork, and each subnetwork is configured to couple a corresponding loss function to provide speech recognition results to the loss function.

7. The method of claim 1, wherein the recurrent neural network comprises a gated recurrent neural network.

8. The method of claim 1, wherein the convolution neural network comprises a convolution kernel matrix, a step of a window movement for the convolution kernel matrix is one when the convolution neural network is processing speech data items.

9. A method for speech recognition, comprising:
providing a speech recognition model comprising a convolution neural network, a first fully connected network, a recurrent neural network and a second fully connected network which are cascade coupled together, wherein each of the networks comprises one or more network layers each having a parameter matrix;

using the following steps to train the speech recognition model:

providing a speech training data set comprising a plurality of speech data items and speech tags each corresponding to a speech data item;

using the speech recognition model to process speech data items of the speech training data set to generate corresponding speech recognition results, enabling the parameter matrices of at least two adjacent network layers of the trained speech recognition model to satisfy a predetermined constraint condition as below:

a condition number $L_{cond}$ is smaller than a first threshold, wherein the condition number is given by an equation $$L_{cond} = \left(\left(\frac{\sigma_{max}}{\sigma_{min}} - 1\right)^2 + (\sigma_{max} - 1)^2\right),$$

wherein $\sigma_{max}$ and $\sigma_{min}$ respectively represent a largest singular value and a smallest singular value of a parameter matrix; and the speech recognition model trained using at least one loss function can generate speech recognition results at an accuracy satisfying a predetermined recognition target;

receiving a speech input signal for processing and preprocessing the speech input signal to generate a corresponding speech feature vector; and using the trained speech recognition model to process the speech feature vector to generate corresponding speech recognition results.

10. The method of claim 9, wherein the speech training data set is a Chinese speech training data set, and the at least one loss function comprises a Chinese phonogram tone loss function, a tone loss function and a toneless Chinese phonogram loss function.

11. The method of claim 10, wherein the speech recognition trained using each loss function can generate speech recognition results at an accuracy exceeding the predetermined recognition target.

12. The method of claim 10, wherein the speech recognition model trained using the respective loss functions can generate speech recognition results at a weighted accuracy exceeding the predetermined recognition target.

13. The method of claim 10, wherein the at least one loss function is a connectionist temporal classification loss function.

14. The method of claim 10, wherein the second fully connected network comprises at least one fully connected subnetwork, and each subnetwork is configured to couple a corresponding loss function to provide speech recognition results to the loss function.

15. The method of claim 9, wherein the recurrent neural network comprises a gated recurrent neural network.

16. The method of claim 9, wherein the convolution neural network comprises a convolution kernel matrix, a step of a window movement for the convolution kernel matrix is one when the convolution neural network is processing speech data items.

17. A non-transitory computer readable medium containing one or more executable instructions, the one or more executable instructions implemented by a processor executing the steps comprising:

providing a speech training data set comprising a plurality of speech data items and speech tags each corresponding to a speech data item;

providing a speech recognition model to be trained, the speech recognition model to be trained comprising a convolution neural network, a first fully connected network, a recurrent neural network and a second fully connected network which are cascade coupled together, wherein each of the networks comprising one or more network layers each having a parameter matrix; wherein, the speech recognition model is configured to process speech data items and generate corresponding speech recognition results; and using the speech training data set to train the speech recognition model such that the parameter matrices of at least two adjacent network layers of the trained speech recognition model satisfies a predetermined constraint condition after training as below:

a condition number $L_{cond}$ is smaller than a first threshold, wherein the condition number is given by an equation $$L_{cond} = \left(\left(\frac{\sigma_{max}}{\sigma_{min}} - 1\right)^2 + (\sigma_{max} - 1)^2\right),$$

wherein $\sigma_{max}$ and $\sigma_{min}$ respectively represent a largest singular value and a smallest singular value of a parameter matrix; and the speech recognition model trained using at least one loss function can generate speech recognition results at an accuracy satisfying a predetermined recognition target.

18. A non-transitory computer readable medium containing one or more executable instructions, the one or more executable instructions implemented by a processor executing the steps comprising:

providing a speech recognition model comprising a convolution neural network, a first fully connected network, a recurrent neural network and a second Bally connected network which are cascade coupled together, wherein each of the networks comprises one or more network layers each having a parameter matrix;

using the following steps to train the speech recognition model:

providing a speech training data set comprising a plurality of speech data items and speech tags each corresponding to a speech data item;

using the speech recognition model to process speech data items of the speech training data set to generate corresponding speech recognition results;

enabling the parameter matrices of at least two adjacent network layers of the trained speech recognition model to satisfy a predetermined constraint condition as below:

a condition number $L_{cond}$ is smaller than a first threshold, wherein the condition number is given by an equation $$L_{cond} = \left(\left(\frac{\sigma_{max}}{\sigma_{min}} - 1\right)^2 + (\sigma_{max} - 1)^2\right),$$

wherein $\sigma_{max}$ and $\sigma_{min}$ respectively represent a largest singular value and a smallest singular value of the parameter matrix; and the speech recognition model trained using at least one loss function can generate speech recognition results at an accuracy satisfying a predetermined recognition target;

receiving a speech input signal for processing and preprocessing the speech input signal to generate a corresponding speech feature vector; and using the trained speech recognition model to process the speech feature vector to generate corresponding speech recognition results.

* * * * *